United States Patent [19]

Idel et al.

[11] 4,331,801

[45] May 25, 1982

[54] PROCESS FOR THE PREPARATION OF POLYARYLENE SULPHIDES

[75] Inventors: Karsten Idel, Krefeld; Josef Merten, Korschenbroich, both of Fed. Rep. of Germany

[73] Assignee: Bayer Aktiengesellschaft, Leverkusen, Fed. Rep. of Germany

[21] Appl. No.: 171,364

[22] Filed: Jul. 23, 1980

[30] Foreign Application Priority Data

Jul. 28, 1979 [DE] Fed. Rep. of Germany ....... 2930797

[51] Int. Cl.³ ............................................ C08G 75/14
[52] U.S. Cl. .................................................... 528/388
[58] Field of Search ......................................... 528/388

[56] References Cited

U.S. PATENT DOCUMENTS 3,658,753 4/1972 Reed et al. .......................... 528/388

*Primary Examiner*—Melvyn I. Marquis
*Attorney, Agent, or Firm*—Connolly and Hutz

[57] ABSTRACT

Preparation of a polyarylene sulphide by polycondensing a substituted p-dihalogenobenzene and optionally a polyhalogeno aromatic compound having at least three halo substituents with an alkali metal sulphide in a polar solvent in the presence of a catalytic amount of a dialkali metal salt of a phosphonic acid.

7 Claims, No Drawings

PROCESS FOR THE PREPARATION OF POLYARYLENE SULPHIDES

Polyarylene sulphides are known in principle (see, for example, U.S. Pat. No. 2,538,941 and U.S. Pat. No. 2,513,188). They can be prepared in the absence of a solvent from the corresponding halogenated aromatic compounds and alkali metal sulphides or alkaline earth metal sulphides.

The preparation by means of alkali metal sulphides can also be effected with the additional use of polar solvents (in this context, see, for example, U.S. Pat. No. 3,354,129 and German Offenlegungsschrift No. 1,468,782), and copper catalysts can also be used if appropriate.

According to German Offenlegungsschrift No. 2,453,749 and U.S. Pat. No. 3,919,177, alkali metal carboxylates are used as catalysts for the preparation of polyarylene sulphides. Amides are used as solvents and inorganic bases are used to activate the sulphur donor.

According to German Offenlegungsschrift No. 2,623,363 and U.S. Pat. No. 4,038,261, lithium chloride and lithium carboxylate are used as catalysts for the preparation of arylene sulphide polymers. N-Methylpyrrolidone and alkali metal hydroxides complete the catalyst system.

Catalysts used for the preparation of polyphenylene sulphides are alkali metal carbonates in combination with alkali metal carboxylates, according to U.S. Pat. No. 4,038,259, lithium halides, according to U.S. Pat. No. 4,038,263, and lithium carbonates, according to U.S. Pat. No. 4,039,518.

According to German Offenlegungsschrift No. 2,623,362 and U.S. Pat. No. 4,038,262, lithium halides or alkali metal carboxylates are used as catalysts for the preparation of arylene sulphide polymers. N-Methylpyrrolidone and alkali metal hydroxides complete the catalyst system.

According to German Offenlegungsschrift No. 2,623,333 and U.S. Pat. No. 4,046,114, lithium acetate is used as the catalyst for the preparation of arylene sulphide polymers. N-Alkylpyrrolidone and if appropriate, as bases, alkali metal hydroxides and/or alkali metal carbonates complete the catalyst system.

According to German Offenlegungsschrift No. 2,817,731 and U.S. Pat. No. 4,116,947, sodium carboxylate in the presence of defined amounts of water are used as catalysts for the preparation of branched arylene sulphide polymers.

According to German Offenlegungsschrift No. 2,131,996, polyarylene sulphides are stabilised by adding organophosphinic acids or organic phosphites.

In contrast, the present invention relates to a process for the preparation of polyarylene sulphides, which can optionally be branched, from (a) p-dihalogenobenzenes which consist of 50 to 100 mol % of compounds of the formula 1

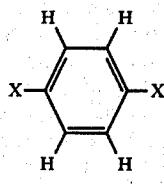

and of 0 to 50 mol % of dihalogenobenzenes of the formula 2

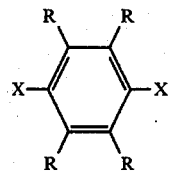

wherein
X is fluorine, chlorine, bromine or iodine and the symbols R are identical or different and can be hydrogen, $C_1$–$C_{20}$-alkyl, $C_5$–$C_{20}$-cycloalkyl, $C_6$–$C_{24}$-aryl, $C_7$–$C_{24}$-alkaryl or $C_7$–$C_{24}$-aralkyl, and in each case at least one R is other than hydrogen, (b) 0 to 2.0 mol %, relative to the p-dihalogenobenzene constituent, of a polyhalogenoaromatic compound of the formula 3

$$ArX_n \qquad 3$$

wherein
Ar is any desired aromatic radical with 6 to 24 C atoms and at least 3 free valencies,
X has the same meaning as in formulae 1 and 2 and $n \geq 3$, and
(c) an alkali metal sulphide, preferably sodium sulphide or potassium sulphide or mixtures thereof, preferably in the form of the hydrates or aqueous mixtures, and if appropriate together with alkali metal hydroxides, in
(d) a polar solvent, preferably an amide or lactam, in particular a N-alkyllactam, the molar ratio of (a) to (c) being in the range from 0.98:1 to 1.02:1 and the molar ratio of (c) to (d) being in the range from 1:1 to 1:10, over a polycondensation period of up to 60 hours, preferably of 2 to 15 hours, and at a polycondensation temperature of between 160° and 285° C., preferably between 190° and 275° C., which is characterized in that the reaction is carried out in the presence of 0.05–2.0 mols, preferably 0.1–1.5 mols, per 1 mol of alkali metal sulphide, of di-alkali metal salts, in particular of disodium salts, of phosphonic acids of the general formula 4

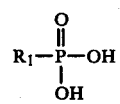

in which
$R_1$ has the meaning of R from formula 2 and can also be $C_2$–$C_{20}$-alkenyl, $C_2$–$C_{20}$-alkinyl or $C_5$–$C_{20}$-cycloalkenyl,
it being possible, preferably, for the di-alkali metal salts of the phosphonic acids to be employed in the form of their hydrates or in aqueous mixtures and one or more dehydration stages being effected before addition of the p-halogenobenzenes.

Polyarylene sulphides with higher intrinsic viscosities and a lower melt flow are obtained by the process according to the invention than by an analogous process without the use of tri-alkali metal phosphates.

The polyarylene sulphides obtainable according to the invention are thus thermoplastics which have a good pattern of mechanical properties and at the same time can be readily processed.

Di-alkali metal salts of phosphonic acids of the formula 4 which are suitable according to the invention are those defined above, it being possible for the radical $R_1$ to have additional substituents which are inert under the reaction conditions of the polyarylene sulphide preparation, that is to say, for example, alkoxy or aryloxy.

The preparation of such phosphonic acids of the formula 4 and their salts is described in detail in Houben-Weyl—"Methoden der organischen Chemie" ("Methods of Organic Chemistry")—Volume XII, 1, page 348 et seq., Georg Thieme Verlag, Stuttgart, 1963. The di-alkali metal salts of the phosphonic acids can be obtained, for example, directly from the free acids by adding stoichiometric amounts of alkali metal hydroxides, for example in an aqueous medium or other solvents. Some or all of the solvent can then be distilled off. If water is used as the solvent, a preparation procedure for the phosphonic acid di-alkali metal salts according to the invention in which none of the water or only some of the water is distilled off after the neutralisation is preferred and the phosphonic acid salts are preferably used in the form of aqueous mixtures for the process according to the invention. The phosphonic acid di-alkali metal salts according to the invention can also be produced directly in the reaction solution by bringing together the phosphonic acid and stoichiometric amounts of alkali metal hydroxides, for example in the form of aqueous mixtures. This water can be removed again in a subsequent dehydration stage. Homogeneous distribution of the salts can be achieved in this manner.

Preferred di-alkali metal salts of the phosphonic acids are the disodium salts.

It is possible to use either single di-alkali metal phosphonates or mixed di-alkali metal phosphonates for the process according to the invention.

The alkali metal sulphides, preferably sodium sulphide or potassium sulphide ($Na_2S$ or $K_2S$) or mixtures thereof, are preferably used as hydrates or in the form of their aqueous mixtures.

The alkali metal sulphides can also be obtained in or out of the reaction solution, from hydrogen sulphide or the alkali metal bisulphides and corresponding stoichiometric amounts of alkali metal hydroxides, by neutralisation. When the pure alkali metal sulphides are used, it is also advisable to additionally add alkali metal hydroxides in order to neutralise alkali metal bisulphides which are frequently present as concomitant materials.

Examples of di-alkali metal salts, preferably disodium salts, which are suitable according to the invention are those of the following phosphonic acids: methane-phosphonic acid, ethane-1-phosphonic acid, propane-1-phosphonic acid, butane-1-phosphonic acid, butane-2-phosphonic acid, pentane-1-phosphonic acid, cyclohexane-1-phosphonic acid, vinyl-1-phosphonic acid, propene-2-phosphonic acid, butene-2-phosphonic acid, indene-2-phosphonic acid, phenylmethane-phosphonic acid, (4-methyl-phenyl)-methane-phosphonic acid, β-naphthyl-methane-phosphonic acid, 2-phenyl-ethane-1-phosphonic acid, 2,2-diphenylethane-1-phosphonic acid, 4-phenyl-butane-1-phosphonic acid, 2-phenyl-ethylene-1-phosphonic acid, 2,2-diphenylethylene-1-phosphonic acid, phenyl-acetylene-phosphonic acid, 4-phenyl-butadiene-phosphonic acid, benzene-phosphonic acid, 4-methyl-benzene-phosphonic acid, 4-ethylbenzene-phosphonic acid and 2-phenoxy-ethane-1-phosphonic acid.

Examples of the p-dihalogenobenzenes of the formula 1 to be used according to the invention are: p-difluorobenzene, p-dichlorobenzene, p-dibromobenzene, p-diiodobenzene, 1-fluoro-4-chlorobenzene, 1-fluoro-4-bromobenzene, 1-chloro-4-bromobenzene, 1-chloro-4-iodobenzene and 1-bromo-4-iodobenzene. They can be used by themselves or as mixtures with one another.

Examples of the p-dihalogenobenzenes of the formula 2 to be used according to the invention are: 2,5-dichlorotoluene, 2,5-dichloroxylene, 1-ethyl-2-dichlorobenzene, 1-ethyl-2,5-dibromobenzene, 1-ethyl-2-bromo-5-chlorobenzene, 1,2,4,5-tetramethyl-3,6-dichlorobenzene, 1-cyclohexyl-2,5-dichlorobenzene, 1-phenyl-2,5-dichlorobenzene, 1-benzyl-2,5-dichlorobenzene, 1-phenyl-2,5-dibromobenzene, 1-p-tolyl-2,5-dichlorobenzene, 1-p-tolyl-2,5-dibromobenzene and 1-hexyl-2,5-dichlorobenzene. They can be used by themselves or as mixtures with one another.

Examples of the polyhalogenoaromatic compounds of the formula 3 to be used according to the invention are: 1,2,3-trichlorobenzene, 1,2,4-trichlorobenzene, 1,2,4-tribromobenzene, 1,2,4-triiodobenzene, 1,3,5-trichloro-2,4,6-trimethylbenzene, 1,2,3-trichloronaphthalene, 1,2,4-trichloronaphthalene, 1,2,6-trichloronaphthalene, 2,3,4-trichlorotoluene, 2,4,6-trichlorotoluene, 1,2,3,4-tetrachloronaphthalene, 1,2,4,5-tetrachlorobenzene and 2,2',4,4'-tetrachlorobiphenyl.

In general, any polar solvent which ensures adequate solubility of the organic and inorganic reactants under the reaction conditions can be used for the reaction. However, lactams and amides are preferably used, and N-alkyllactams are particularly preferably used.

Lactams in the context of the present invention are those of aminoacids which have 3 to 5 C atoms and which can optionally carry substituents which are inert under the reaction conditions, such as, for example, an alkyl radical with 1 to 5 C atoms, on the carbon skeleton.

N-Alkyllactams in the context of the present invention are defined in the same way as the lactams according to the invention, but they additionally carry an alkyl radical with 1 to 3 C atoms on the nitrogen atom.

Amides in the context of the invention are those of carboxylic acids of 1 to 5 C atoms, and preferably those of carboxylic acids which have 1 to 5 C atoms and carry two alkyl radicals with 1 to 3 C atoms on the amide nitrogen.

Examples of possible solvents are: dimethylformamide, dimethylacetamide, caprolactam, N-methylcaprolactam, N-ethylcaprolactam, N-isopropylcaprolactam, N-methyl-2-pyrrolidone, N-ethyl-2-pyrrolidone, N-isopropyl-2-pyrrolidone, N-methyl-3-methyl-2-pyrrolidone, N-methyl-5-methyl-2-pyrrolidone, N-methyl-3,4,5-trimethyl-2-pyrrolidone, N-methyl-2-piperidone, N-ethyl-2-piperidone, N-methyl-6-methyl-2-piperidone, N-methyl-3-ethyl-2-piperidone, N-methyl-2-oxohexamethyleneimine and N-ethyl-2-oxohexamethyleneimine.

Mixtures of the above solvents can also be chosen.

In the process according to the invention, the p-dihalogenobenzene, if appropriate a polyhalogenoaromatic compound of the formula 3, the alkali metal sulphide, if appropriate together with an alkali metal hydroxide, and the di-alkali metal salts of the phosphonic acids can in principle be mixed and reacted in any form in the polar solvent, which is preferably an amide or lactam, and particularly preferably a N-alkyllactam. However, it is advantageous for at least most of the water to be removed before addition and reaction of the p-dihalogenobenzene, this water being in the form of water of hydration in the alkali metal sulphides and the alkali metal salts of the phosphonic acids and/or in the free form as a mixing component of aqueous solutions of the sulphides and phosphonates to be employed according to the invention.

Dehydration can be effected, for example, by distilling the water out of the reaction solution. In a preferred reaction procedure, the N-alkyllactam is initially introduced into the reaction vessel together with the phosphonates according to the invention and the water of hydration or mixing water is removed in a first dehydration stage. The desired proportions of alkali metal sulphide are then added and a second dehydration stage is effected if necessary. Thereafter, the p-dihalogenobenzene and, if appropriate, the polyhalogeno compound of the formula 3 are added and the actual polymerisation reaction is initiated, whilst further increasing the temperature.

The temperature should be increased slowly in the dehydration stages in order to prevent the reaction mixture from foaming.

As soon as the boiling point of the solvent is reached, the actual polymerisation reaction can be started.

The reaction temperature for the polycondensation according to the invention is as a rule in the range from 160° C. to 285° C., preferably in the range from 190° to 275° C. The reaction time can be up to 60 hours, but is preferably between 2 and 15 hours. Stepwise increase of the reaction temperature over this period is advantageous.

As far as possible equimolar amounts of the p-dihalogenobenzene and the alkali metal sulphide are reacted. Accordingly, the molar ratio of p-dihalogenobenzene/alkali metal sulphide is in the range from 0.98:1 to 1.02:1.

The polyhalogenoaromatic compounds of the formula 3 to be used according to the invention can be added in an amount of up to several mol %, relative to the p-dihalogenobenzene constituent, depending on the process conditions. However, an amount of 0 to 2.0 mol %, relative to the p-dihalogenobenzene constituent, is as a rule sufficient.

The amount of solvent can be chosen within wide limits, but is in general 1 to 10 mols per mol of alkali metal sulphide.

The amount of alkali metal hydroxide is chosen according to the proportions of alkali metal bisulphide in the technical grade alkali metal sulphide. It can be up to 0.8 mol per mol of alkali metal sulphide, but this amount can be exceeded if appropriate.

The alkali metal hydroxides used are, for example, lithium hydroxide, sodium hydroxide and potassium hydroxide or mixtures thereof. Alkali metal carbonates, such as lithium carbonate, sodium carbonate and potassium carbonate and mixtures thereof, can also be used for the same purpose.

The amount of alkali metal phosphonates according to the invention can be varied, depending on the process conditions, but is in general between 0.05 and 2 mols, preferably 0.1 and 1.5 mols, per mol of alkali metal sulphide.

The reaction mixture can be worked up in various ways.

The polyarylene sulphide can be separated off from the reaction solution by customary procedures, for example by filtration or by centrifuging, directly or only after the addition of, for example, water.

Washing with water generally follows the filtration in order to remove salt-like concomitant materials which can adhere to the polymers, such as, for example, the alkali metal sulphides or the phosphonic acid salts according to the invention.

Washing or extraction with other wash liquids in addition to or after this washing, is, of course, also possible.

The polymer can also be obtained by stripping off the solvent in the reaction chamber and subjecting the product to subsequent washing as described above.

Compared with the uncatalysed preparation of polyarylene sulphides, polyarylene sulphides with a higher intrinsic viscosity and a lower melt flow are obtained by the process according to the invention.

In German Offenlegungsschriften Nos. 2,623,333 and 2,623,363, the intrinsic viscosity in 1-chloro-naphthalene at 206° C. and at a concentration of 0.4 g of polymer/100 ml of solvent is measured as a reference value for the molecular weight. However, the danger of the formation of associates is relatively great in this temperature and concentration range. The polyarylene sulphides according to the invention are therefore characterised by determining the intrinsic viscosity $[\eta]$, which is obtained by measuring intrinsic viscosities and extrapolating the concentration to zero.

$$[\eta] = \frac{\ln \eta_{rel}}{C} \ (C \longrightarrow 0)$$

The low melt flow of the polyarylene sulphides according to the invention compared with that of polyarylene sulphides obtained without catalysis offers particular advantages from the point of view of process technology. (The melt index is measured in accordance with the method of ASTM D 1238-70, using a 5 kg weight and altering the temperature to 316° C., the value being expressed in g/10 minutes).

Since the melt flow of the polyarylene sulphides according to the invention is in the range from 1–700 g/10 minutes, preferably 1–250 g/10 minutes, an additional hardening stage, which is otherwise necessary, can be spared and the products can be processed directly, without further hardening, by extrusion, extrusion blow-moulding, injection-moulding or other customary processing methods, to give films, shaped articles or fibres which are used in the customary manner as automobile components, fittings, electrical components, such as, for example, switches and printed circuit boards, chemical-resistant components and equipment, such as pump housings and pump vanes, etching bath dishes, sealing rings, components for office machines and telecommunication equipment, and domestic appliances, valves, ball-bearing components and the like.

The properties of the polyarylene sulphides can be modified or optimised by additional processing steps, such as, for example, heat treatment or mixing with other components.

The polyarylene sulphides according to the invention can also be mixed with other polymers, with pigments and with fillers, such as, for example, graphite, metal powders, glass powder, quartz flour or glass fibres, or the additives customary for polyarylene sulphides, such as, for example customary stabilisers or mould release agents, can be added.

In the following text, the invention is described by examples without being limited to these examples.

EXAMPLE 1

This example describes, as a comparison example, the preparation of a polyphenylene sulphide without the catalysis according to the invention (U.S. Pat. No. 3,354,129).

130 g (1.0 mol/60% strength material) of sodium sulphide $Na_2S \times H_2O$) and 300 g of N-methyl-2-pyrrolidone were brought together in an autoclave provided with a stirrer. The mixture was flushed with nitrogen and warmed slowly to 202° C. A total of 29 ml of water thereby distilled off. The batch was then cooled down to about 160° C. and 147 g of p-dichlorobenzene in about 50 g of N-methyl-2-pyrrolidone were added. The reaction mixture was warmed, under an initial nitrogen pressure of 2.5 bars, to 245° C. in the course of 30 minutes, during which the pressure rose to 10 bars, and this temperature was maintained for 3 hours. After cooling the mixture to room temperature, a grey solid was isolated and was then subjected to thorough washing with water to remove the concomitant inorganic materials.

The product was dried at 80° C. in vacuo and 100.3 g (93%) of poly-(p-phenylene sulphide) with the following characteristics were obtained;

Intrinsic viscosity $[\eta]$: 10.2
Melt index, g/10 minutes: 2,400

EXAMPLE 2

The disodium salt of methanephosphonic acid was used as a catalyst in the process according to the invention.

A solution of 262.5 g (1.87 mols) of the disodium salt of methanephosphonic acid ($CH_3PO_3Na_2$) in 200 g of water was added to 1,000 ml of N-methyl-2-pyrrolidone and the entire mixture was kept under nitrogen. 185 ml of water in the form of a water/N-methyl-2-pyrrolidone mixture containing 92% of water were distilled off by slowly heating the mixture to 172° C.

245.7 g of 60% strength sodium sulphide ($Na_2S \times 3$-$H_2O$) (1.87 mols) and 12 g of sodium hydroxide in 40 ml of water were then added. The second dehydration was carried out analogously to the first, with the difference that the mixture was heated up to 202° C. A distillate which contained 121 ml of water was collected.

After cooling the mixture to 160° C., 275.6 g (1.87 mols) of p-dichlorobenzene and 2.72 g (0.8 mol %, relative to the p-dichlorobenzene constituent) of 1,2,4-trichlorobenzene in 120 ml of N-methyl-2-pyrrolidone were added to the reaction solution and the batch was reacted in an autoclave with a stirrer according to the following pressure/temperature programme:

1 hour at 210° C. and under 3 bars
2 hours at 245° C. and under 11 bars
3 hours at 265° C. and under 13 bars The batch was then cooled down and the poly-p-phenylene sulphide was isolated as a grey powder from the reaction mixture, for example by dilution with water. After drying, a yield of 99% (200.2 g) resulted. Compared with the product of Example 1, the poly-p-phenylene sulphide had a considerably higher intrinsic viscosity and a significantly lower melt flow.

Intrinsic viscosity $[\eta]$: 25
Melt index, g/10 minutes: 89

EXAMPLE 3

In comparison with Example 2, only one dehydration stage was effected in this example:

A solution of 262.5 g (1.87 mols) of the disodium salt of methane-phosphonic acid in 299 g of water, 245.7 g of 60% strength sodium sulphide (1.87 mols, $Na_2S \times 3$-$H_2O$) and 12 g of sodium hydroxide in 40 g of water were added successively to 1,000 ml of N-methyl-2-pyrrolidone. The mixture was heated slowly, under nitrogen, until the temperature had reached 202° C., in the final stage. During this heating, 357 ml of a distillate which contained 314 ml of water were obtained. 275.6 g (1.87 mols) of p-dichlorobenzene and 2.04 g (0.6 mol%, relative to the p-dichlorobenzene constituent) of 1,2,4-trichlorobenzene were then added and the batch was reacted according to the same pressure/temperature programme as in Example 2. After filtering off the product and washing it with water, 199.8 g (99%) of poly-p-phenylene sulphide were obtained.

Intrinsic viscosity $[\eta]$: 16
Melt index, g/10 minutes: 358

EXAMPLE 4

In this example, the catalytically active disodium salt of methane-phosphonic acid is produced directly in the reaction solution. A solution of 150 g of sodium hydroxide in 150 g of water and 180 g of methane-phosphonic acid in 150 g of water were carefully brought together in 1,000 ml of N-methyl-2-pyrrolidone under a nitrogen atmosphere, the exothermic neutralisation reaction being taken into consideration.

Whilst slowly increasing the temperature of the reaction mixture to 170° C., 288 ml of water were then obtained in a total 312 ml of distillate of N-methyl-2-pyrrolidone and water.

245.7 g of 60% strength sodium sulphide (1.87 mols) and 20 g of sodium hydroxide in 40 g of water were then added.

The second dehydration stage was then carried out accordingly, the temperature being increased to 202° C. 180 ml of distillate which contained 138 ml of water were collected.

After cooling the mixture to 160° C., 275.6 g (1.87 mols) of p-dichlorobenzene and 2.72 g (0.8 mol %, relative to the p-dichlorobenzene constituent) of 1,2,4-trichlorobenzene in 120 ml of N-methyl-2-pyrrolidone were added and the batch was reacted in an autoclave with a stirrer according to the pressure/temperature programme in Example 2. Working up was also carried out according to Example 2.

Yield: 201.0 g (99%) of poly-p-phenylene sulphide.
Intrinsic viscosity $[\eta]$: 26.5
Melt index, g/10 minutes: 68

EXAMPLE 5

The reaction procedure corresponds to that in Example 2. However, in comparison with Example 2, only half the molar amount of the disodium salt of methane-phosphonic acid (131.25 g=0.937 mol) was employed. The poly-p-phenylene sulphide was obtained in 99% yield.

Intrinsic viscosity $[\eta]$: 23.5
Melt index, g/10 minutes: 95

EXAMPLE 6

The reaction procedure is analogous to that in Example 5, with the difference that instead of the disodium salt of methane-phosphonic acid, the dipotassium salt (161.3 g=0.937 mol) was employed.

Yield: 99%.
Intrinsic viscosity [η]: 22
Melt index, g/10 minutes: 132

EXAMPLE 7

The reaction procedure is analogous to that in Example 5, with the difference that 157.4 g (0.937 mol) of the disodium salt of propane-2-phosphonic acid were employed.

Yield: 99%.
Intrinsic viscosity [η]: 23
Melt index, g/10 minutes: 110

EXAMPLE 8

The reaction procedure is analogous to that in Example 5, with the difference that 71.2 g (0.47 mol) of the disodium salt of vinyl-1-phosphonic acid were employed.

Yield: 99%.
Intrinsic viscosity [η]: 19
Melt index, g/10 minutes: 280

EXAMPLE 9

The reaction procedure is analogous to that in Example 8, but with the difference that instead of the disodium salt of vinyl-1-phosphonic acid, the disodium salt of 2-methyl-propene-2-phosphonic acid was employed in the same molar amount.

Yield: 99%.
Intrinsic viscosity [η]: 17
Melt index, g/10 minutes: 312

We claim:

1. In the process for preparing a polyarylene sulphide by polycondensing at a temperature of from 160°–285° C. for up to 60 hours
   (a) a p-dihalogenobenzene which consists of 50–100 mol % of a compound of the formula

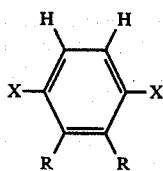

and 0–50 mol % of a compound of the formula

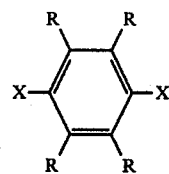

wherein X is fluorine, chlorine, bromine or iodine and each R is independently selected from the group consisting of hydrogen, $C_1$–$C_{20}$-alkyl, $C_5$–$C_{20}$-cycloalkyl, $C_6$–$C_{24}$-aryl, $C_7$–$C_{24}$-alkaryl and $C_7$–$C_{24}$-aralkyl with the proviso that at least one R is other than hydrogen; and
   (b) 0–2.0 mol %, based on (a), of a compound of the formula Ar $X_n$ wherein Ar is an aromatic radical having 6 to 24 carbon atoms, X is as aforesaid and n is at least 3 with
   (c) an alkali metal sulphide in
   (d) a polar solvent, the molar ratio of (a) to (c) being from 0.98:1 to 1.02:1 and the molar ratio of (c) to (d) being from 1:2 to 1:10, the improvement wherein said polycondensation is carried out in the presence of 0.05–2.0 mols of a di-alkali metal salt of a phosphonic acid per mol of (c), said phosphonic acid being of the formula

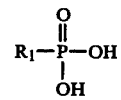

wherein $R_1$ is hydrogen, $C_1$–$C_{20}$-alkyl, $C_5$–$C_{20}$-cycloalkyl, $C_6$–$C_{24}$ aryl, $C_7$–$C_{24}$-alkaryl, $C_7$–$C_{24}$-aralkyl, $C_2$–$C_{24}$-alkenyl, $C_2$–$C_{20}$-alkinyl or $C_5$–$C_{20}$-cycloalkenyl.

2. The process of claim 1 wherein said polycondensation is carried out from 2–15 hours.

3. The process of claim 1 wherein said polycondensation temperature is from 190°–275° C.

4. The process of claim 1 wherein said polycondensation is carried out in the presence of 0.1 to 1.5 mols of said di-alkali metal salt of a phosphonic acid.

5. The process of claim 1 wherein said polycondensation is carried out in the presence of a disodium salt of a phosphonic acid.

6. The process of claim 1 wherein the dialkali metal salt of the phosphonic acid is used in the form of its hydrate or an aqueous mixture and the polycondensation reaction mixture is dehydrated at least once before introducing (a).

7. The process according to claim 6 wherein the hydrate of or an aqueous mixture of the disodium salt of the phosphonic acid is employed.

* * * * *